United States Patent [19]

Hughes

[11] 4,092,500

[45] May 30, 1978

[54] DEVICE FOR SELECTIVELY INTERRUPTING MECHANICAL OPERATION OF A MANUALLY OPERATED TELEPHONE

[76] Inventor: George W. Hughes, 2601 Mills, Houston, Tex. 77026

[21] Appl. No.: 718,896

[22] Filed: Aug. 30, 1976

[51] Int. Cl.² ............................................. H04M 1/66
[52] U.S. Cl. .................................................. 179/90 D
[58] Field of Search ............ 174/90 D, 189 D, 189 R, 174/18 DA, 6.3 R

[56] References Cited

U.S. PATENT DOCUMENTS

| 3,513,271 | 5/1970 | Stathacopoulos | 179/90 D |
| 3,757,055 | 9/1973 | McCann et al. | 179/90 D |
| 3,899,640 | 8/1975 | Piacente et al. | 179/18 DA |
| 3,937,900 | 2/1976 | Nagakura | 179/189 D |
| 4,000,380 | 12/1976 | Jackson | 179/90 D |

FOREIGN PATENT DOCUMENTS

| 2,037,203 | 2/1972 | Germany | 179/90 D |

*Primary Examiner*—Kathleen H. Claffy
*Assistant Examiner*—Gerald L. Brigance
*Attorney, Agent, or Firm*—Ranseler O. Wyatt

[57] ABSTRACT

An attachment for telephones using direct dialing mechanism, or the push button type, which may be selectively moved to one position to prevent the user from completing a direct dial long distance call, and into another position that will prevent such calls by interrupting the service when the user attempts to dial the Operator.

2 Claims, 10 Drawing Figures

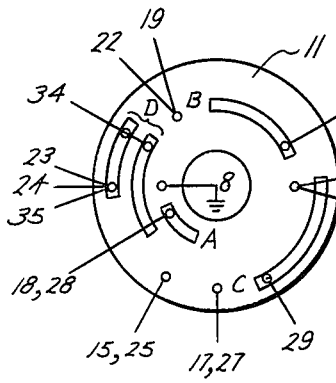
POSITION 1
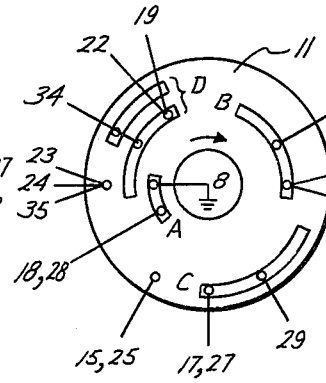
POSITION 2
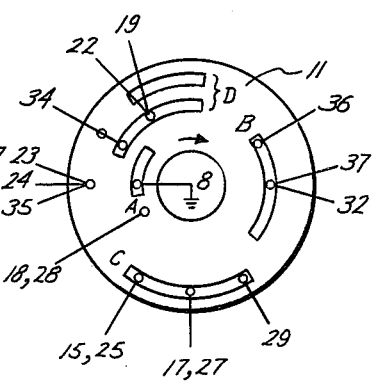
POSITION 3
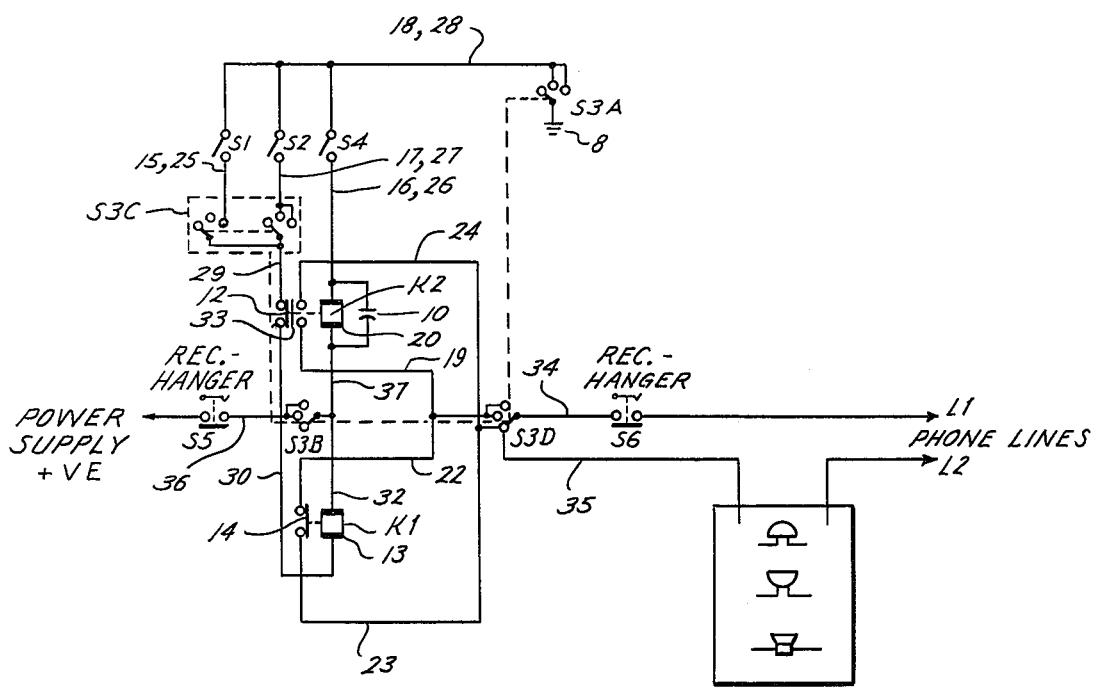
Fig. 7

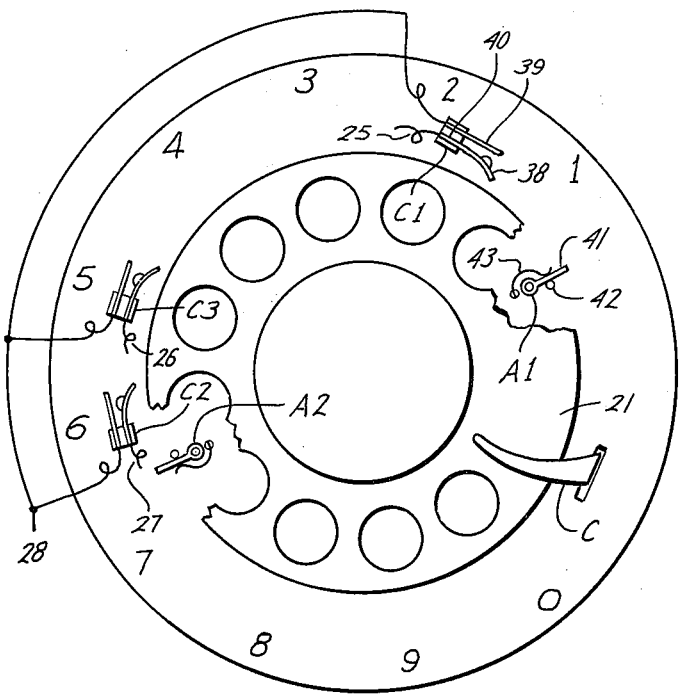
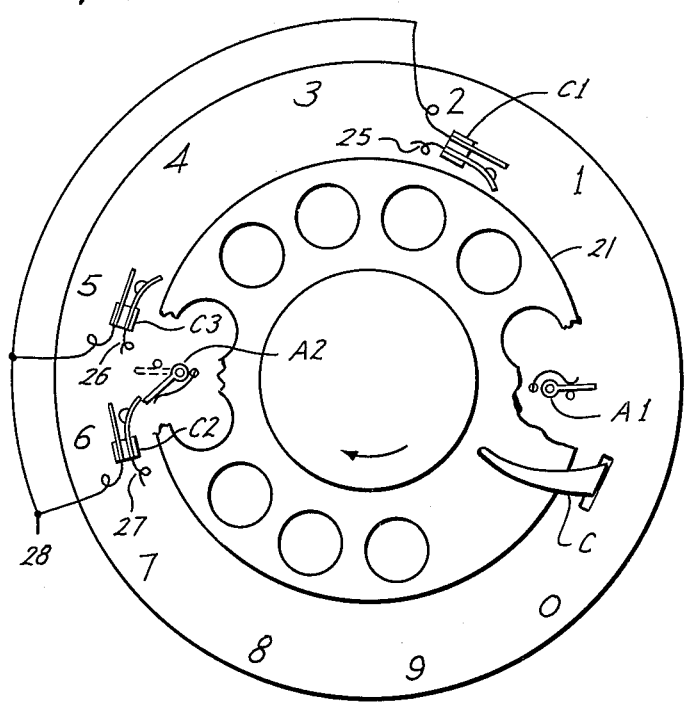
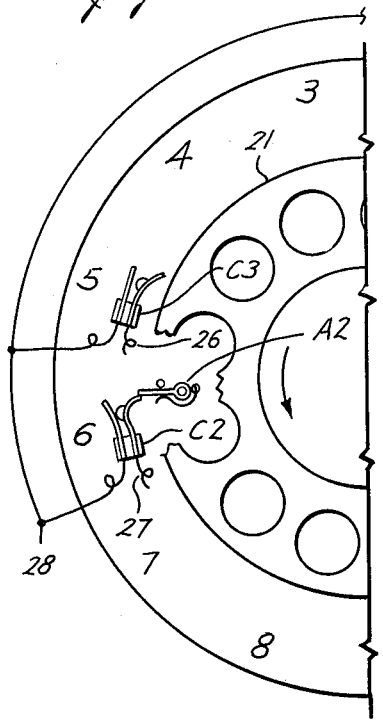

DEVICE FOR SELECTIVELY INTERRUPTING MECHANICAL OPERATION OF A MANUALLY OPERATED TELEPHONE

BACKGROUND OF THE INVENTION

Many places of business, as well as homes, have difficulty with unauthorized long distance telephone calls, and in many cases, children playing with a telephone, dial long distance numbers, for which the subscriber is billed. In such instances it has been long felt that a need exists for means for limiting the type of calls possible on any instrument, or selectively limiting the calls possible, so that only local calls may be completed.

SUMMARY OF THE INVENTION

An attachment for telephones wherein the power flow is interrupted, preventing the completion of the call, if the long distance digit "1" is primarily actuated, having locking means for moving the device into or out of connection by use of a key, and having switches selectively operable for effecting such interruptions of power. Included in this arrangement is a special switch, novel in its construction, designed to accomplish the above purposes, adaptable to a push type telephone keyboard, as well as the usual dial disc.

BRIEF DESCRIPTION OF THE DRAWINGS

FIG. 4 is a top plan view of the contact disc of the locking type, key operated selector switch showing the disc in the first position.

FIG. 5 is a top plan view of the contact disc, showing the disc in the second position.

FIG. 6 is a top plan view of the contact disc, showing the disc in the third position.

FIG. 7 is an electrical diagram of the circuits employed.

FIG. 8 is a top plan view, partially broken away, illustrating the pairs of contacts and activators employed in the rotatable-dial type instrument, showing the dial in the normal position.

FIG. 9 is a top plan view, partially broken away, illustrating the slipping past of the activator A2 without closing the pair of contacts C2.

FIG. 10 is a fragmentary view of the view shown in FIG. 9, illustrating the closing of the pair of contacts C2 by the activator A2.

DESCRIPTION OF THE PREFERRED EMBODIMENTS

Figure 1:
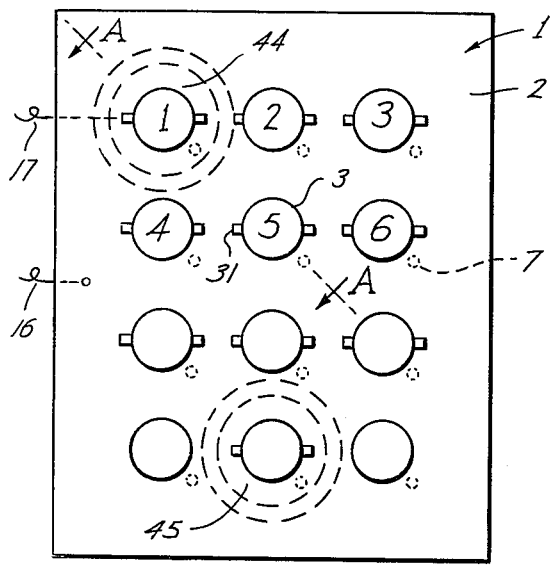
FIG. 1 is a top plan view of a punch type telephone keyboard, also known as the touch tone type, indicating the isolation of the long distance key "1" and the operator key "0".
Figure 2:
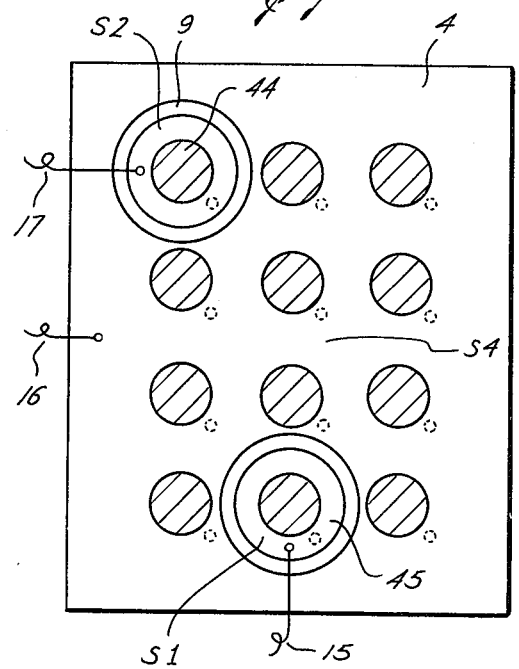
FIG. 2 is a sectional view of the keyboard shown in FIG. 1, sectioned through section plane B—B as shown in FIG. 3.
Figure 3:
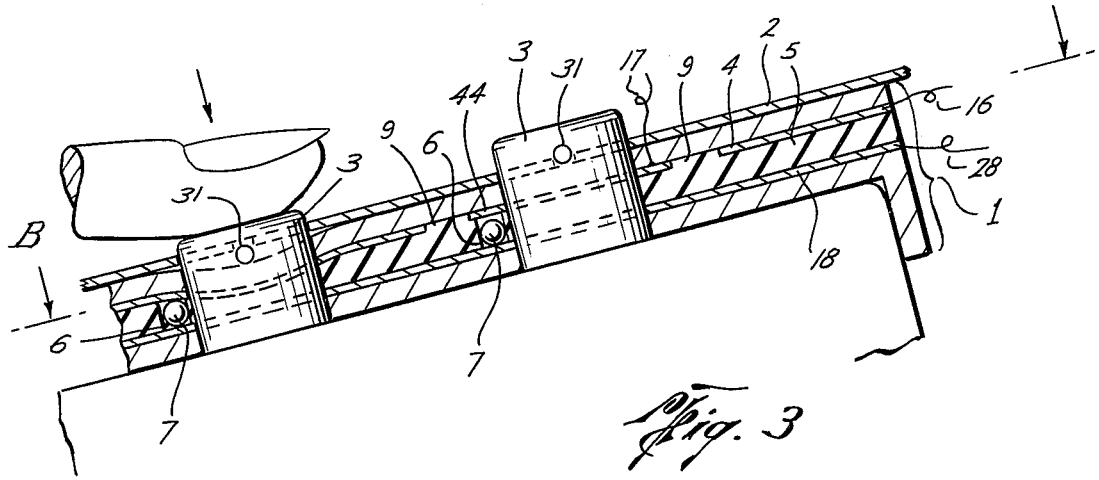
FIG. 3 is an enlarged, fragmentary view of the keyboard shown in FIG. 1, in cross section, taken on the line A—A of FIG. 1.

In FIGS. 1 and 3 the numeral 1 designates a plate to be inserted under the face plate 2 of a push type (touch tone) telephone instrument, having the usual punch keys 3, said inserted plate being formed of two thin sheets of conductive material 4 and 18, separated by a sheet of flexible, nonconductive material 5, such as rubber, in which passageways as 6 have been formed. Steel balls 7, of slightly smaller diameter than the cross sectional measurement of the rubber 5 are placed in passageways 6 adjacent each key, so that as the key is depressed the upper sheet of conductive material 4 will be moved into contact with the ball 7, which in turn is in contact with the bottom sheet of conductive material 18, the whole arrangement functioning as switch S4. The keys 2, 9 are arranged so that the pressing of any of the mentioned keys will have the effect of closing switch S4. Keys "1" and "0" are arranged differently. Keys "1" and "0" have separate metal rings 44 and 45, respectively, separated from conductive sheet 4 by the insulating material 9 which is actually a part of insulator 5. The sheet metal ring 44 around key "1", a steel ball 7, and the bottom sheet of conductive material 18 comprises switch S2. Another sheet metal ring 45 around key "0", another steel ball 7, and the bottom sheet of conductive material 18 comprises switch S1. The bottom sheet of conductive material 18 is connected through wire 28 to selector switch S3A, which is part of the disc selector switch S3. A preferred method of providing for the movement of the keys 3 against the top plate 4, is to provide a transverse pin 31 through each key 3, which bears against the top plate 4 and moves it against the steel ball 7 when the key 3 is depressed.

FIGS. 8, 9 and 10 show the dial and number plate of a usual rotatable-dial type telephone instrument. Mounted inside the instrument fixed with respect to the rotatable dial 21, are two switch activators A1, A2, which are at different levels. Switch activator A1 consists of a pivotal contact member 41, a stop 42 and a spring 43. Switch activator A2 is of similar construction. Mounted inside the instrument fixed with respect to the telephone instrument, are three pairs of normally open contacts C1, C2 and C3. C1 is at the same level as switch activator A1. C2 and C3 are at the same level as switch activator A2. The pair of contacts C1 consists of two contact points 38, 39 separated by an insulating washer 40. The other two pairs of contacts C2 and C3 are of similar construction. When the switch activator A1, moving clockwise, almost making a complete revolution, as when dialing "0", comes across the pair of contacts C1, the pivotal contact member 41 will yield to slip past the contact point 38, due to the yielding of the spring 43. But upon the return movement in the counterclockwise direction, the pivotal contact member 41 will be stopped by the stop 42 and forces the contact point 38 into contact with the contact point 39, functioning as switch S1. The other pairs of contacts C2 and C3, function as switches S2 and S4, respectively. The pair of contacts C1 and the switch activator A1 are located such that the switch activator A1 will go past the pair of contacts C1 only if the number "0" is dialed. The pair of contacts C2 and the switch activator A2 are located such that the switch activator A2 will go slightly past the pair of contacts C2 if the number 1 is dialed. The pair of contacts C3 is located next to the pair of contacts C2 such that the switch activator A2 will go slightly past it if the number 2 is dialed. One of the contact points from each of the three pairs of contacts are joined together through wire 28 which also leads to selector switch S3.

The disc shown in FIGS. 4, 5 and 6 is a locking type, key operated selector switch S3. In its first position, as shown in FIG. 4, the telephone instrument operates as the usual device. In its second position, as shown in FIG. 5, any attempt to make a long distance call by dialing key "1" will be inhibited. In its third position, as shown in FIG. 6, any attempt to make a long distance call by dialing key "1", or to call the operator by dialing key "0" will be inhibited.

The circuit in the diagram illustrated in FIG. 7 is as follows:

With the locking type, key operated selector switch S3 set in its third position, as shown in FIG. 6, when the receiver is lifted off the telephone instrument for dialing (or button pushing), telephone receiver hook switch S5 will be closed, connecting the positive terminal of the power supply through wire 36 and selector switch S3B into the circuit, ready for energizing relay coils 13, 20 of relays K1, K2 respectively, and telephone receiver hook switch S6 will be closed, connecting phone line L1 through selector switch S3D, wire 22, relay contacts 14, wire 23 to wire 35. Wire 35 will lead into the usual internal connections of the telephone instrument and return to the central exchange is made through phone line L2. When the number 1 is dialed, switch S2 will be closed, and current will then flow from the positive terminal of the power supply, through switch S5, wire 36, selector switch S3B, wire 32, relay coil 13, relay contacts 12, wire 29, selector switch S3C, wire 36 (if rotatable-dial type), or wire 27 (if touch-tone type), switch S2, wire 28, selector switch S3A to ground 8, forming a complete circuit, energizing relay K1, opening relay contacts 14, disconnecting wire 35 from phone line L1, giving a disconnect signal to the central exchange and render the dialing of "1" unsuccessful.

When the number "0" is dialed, switch S1 will be closed, causing the aforementioned circuit performance to occur and render the dialing of "0" unsuccessful.

When any number between 2 and 9 is dialed first, switch S4 will be closed. Current will then flow from the positive terminal of the power supply, through switch S5, wire 36, selector switch S3B, wire 37, relay coil 20, charging up the capacitor 10, wire 16 (if rotatable-dial type) or wire 26 (if touch-tone type), switch S4, wire 28, selector switch S3A to ground 8, forming a complete circuit, energizing relay K2, closing relay contacts 33, and opening relay contacts 12. The capacitor 10, already charged, will keep the relay coil 20 energized for a predetermined length of time, allowing a short lapse of time before the dialing of the next number. Capacitor 10 will be charged every time numbers from 2 to 9 are dialed. The opening of relay contacts 12 ensures that relay coil 13 will not be energized by subsequent dialing of either "1" or "0", so that no disconnect signal will be sent to the central exchange. The closing of relay contacts 33 ensures that phone line L1 is connected through S6, wire 34, selector switch S3D, wire 19, relay contacts 33, wire 24 to wire 35 which leads into the usual internal connections of the telephone instrument.

If the locking type, key operated selector switch S3 is set in its second position, as shown in FIG. 5, switch S1 will be disabled by selector switch S3C and only the dialing of "1" will be inhibited.

If the locking type, key operated selector switch S3 is set in its first position, as shown in FIG. 4, both switches S1 and S2 will be disabled by selector switch S3C, the power supply will be disconnected by selector switch S3B, the ground 8 will be disconnected by selector switch S3A, and the phone line L1 will be connected through S6, wire 34, selector switch S3D, directly to wire 35 which leads into the usual internal connections of the telephone instrument, and the telephone instrument will operate in the normal way, with no inhibition of any number dialed.

When the telephone receiver is hung up, the power supply will be cut off by telephone receiver hook switch S5, returning all switches and relay contacts, except the locking type, key operated selector switch S3, to their normal positions.

What I claim is:

1. In an attachment for a tone telephone having a manually actuable telephone number selector keyboard, a first means for selectively interrupting a telephone connection, said first means comprising a bypass switch assembly operable in one position to complete said connection and in another position to interrupt said connection when either the digit "0", indicating the operator, or "1", indicating a long distance code, are initially dialled, and switching means operable to deactivate the bypass switch after the second digit is dialled when the first dialled digit is other than "0" or "1", second means attached to said keyboard for indicating to said first means that a "1" or "0" has been dialled, said second means comprising upper and lower thin sheets of flexible conductive material separated by a flexible insulating sheet including a passageway adjacent to each key, said upper sheet including circular openings around the "1" and "0" keys with conductive metal rings, which are separate and insulated from said upper sheet, surrounding said "1" and "0" keys and covering their associated passageways, contact means in each passageway such that, when any key is pressed, the upper conductive sheet, or the separate ring in the case of the "1" and "0" keys, is placed in electrical contact with the lower conductive sheet.

2. In the device of claim 1, third means operable in a first position to disable said first means, thus permitting said telephone to operate unrestricted, said third means operable in a second position to enable said first means to interrupt said connection only in response to said "1" key and operable in a third position to enable said first means to interrupt said connection in response to either said "1" or said "0" key.

* * * * *